United States Patent
Zhou et al.

(10) Patent No.: US 12,510,872 B2
(45) Date of Patent: Dec. 30, 2025

(54) OPERATIONAL INSPECTION SYSTEM AND METHOD FOR DOMAIN ADAPTIVE DEVICE

(71) Applicant: SOUTH CHINA UNIVERSITY OF TECHNOLOGY, Guangzhou (CN)

(72) Inventors: Zhiheng Zhou, Guangzhou (CN); Pengyu Zhang, Guangzhou (CN); Junchu Huang, Guangzhou (CN); Bo Li, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 442 days.

(21) Appl. No.: 18/039,289

(22) PCT Filed: Oct. 31, 2021

(86) PCT No.: PCT/CN2021/127789
§ 371 (c)(1),
(2) Date: May 30, 2023

(87) PCT Pub. No.: WO2022/111219
PCT Pub. Date: Jun. 2, 2022

(65) Prior Publication Data
US 2023/0418250 A1    Dec. 28, 2023

(30) Foreign Application Priority Data
Nov. 30, 2020 (CN) .......................... 202011372238.9

(51) Int. Cl.
G05B 19/042    (2006.01)
(52) U.S. Cl.
CPC .... *G05B 19/042* (2013.01); *G05B 2219/2639* (2013.01)
(58) Field of Classification Search
CPC .......... G05B 19/042; G05B 2219/2639; G05B 23/0221; G06V 10/30; G06V 20/17;
(Continued)

(56) References Cited

U.S. PATENT DOCUMENTS

2020/0082221 A1    3/2020    Tsai et al.

FOREIGN PATENT DOCUMENTS

| CN | 109145905 A | * | 1/2019 | ....... G06F 18/23213 |
| CN | 110796107 | | 2/2020 | |

(Continued)

OTHER PUBLICATIONS

"International Search Report (Form PCT/ISA/210) of PCT/CN2021/127789," mailed on Jan. 28, 2022, with English translation thereof, pp. 1-4.

*Primary Examiner* — Charles Cai
(74) *Attorney, Agent, or Firm* — JCIPRNET

(57) ABSTRACT

Disclosed is an operational inspection system and method for a domain adaptive device. The method includes: acquiring, by an image acquisition processing module, a routine inspection image to be detected of a transmission line and pre-processing the image; inputting the routine inspection image to be detected into a predetermined weather condition classification model to identify a weather condition to which the routine inspection image to be detected belongs, for obtaining a weather condition classification result; selecting a corresponding predetermined domain adaptive device operational inspection model by the weather condition classification result; and inputting the routine inspection image to be detected into the predetermined domain adaptive device operational inspection model to obtain a detection result of the routine inspection image to be detected, wherein the detection result includes one or more of device type, working condition and position information of a detection object in the routine inspection image to be detected.

20 Claims, 5 Drawing Sheets

(58) Field of Classification Search
CPC .... G06V 10/806; G06V 10/454; G06N 3/045; G06N 3/08; Y04S 10/50; G06Q 10/20; G06Q 50/06; G06F 18/253; G07C 1/20
See application file for complete search history.

(56) References Cited

FOREIGN PATENT DOCUMENTS

| | | | | |
|---|---|---|---|---|
| CN | 110837800 | | 2/2020 | |
| CN | 111008961 A | * | 4/2020 | ....... G06F 18/24323 |
| CN | 111784685 | | 10/2020 | |
| CN | 111798029 | | 10/2020 | |
| CN | 111860670 | | 10/2020 | |
| CN | 112183788 | | 1/2021 | |

* cited by examiner

OPERATIONAL INSPECTION SYSTEM AND METHOD FOR DOMAIN ADAPTIVE DEVICE

CROSS-REFERENCE TO RELATED APPLICATION

This application is a 371 of international application of PCT application serial no. PCT/CN2021/127789, filed on Oct. 31, 2021, which claims the priority benefit of China application serial no. 202011372238.9, filed on Nov. 30, 2020. The entirety of each of the above-mentioned patent applications is hereby incorporated by reference herein and made a part of this specification.

TECHNICAL FIELD

The present invention relates to the technical field of artificial intelligence, information processing technology and operational inspection and maintenance of power grids, and particularly relates to an operational inspection system and method for a domain adaptive device.

BACKGROUND

In recent years, artificial intelligence has played increasingly significant role in the technical field of operational inspection and maintenance of power grids. An operational inspection system for a high voltage transmission line based on deep learning conducts supervised training on massive labeled operational inspection image data, which becomes a necessary means for operational inspection of the power grid, thereby improving the detection accuracy and shortening the fault processing time.

In a specific operational inspection system for a high voltage transmission line for inspection system and maintenance of the power grid, a terminal device acquires a routine inspection image to be detected, then the routine inspection image to be detected is inputted into a convolutional neural network for feature extraction thereof, then a region-of-interest generator generates a target existing region, and finally, a identifier and a position positioner constructed by a fully connected neural network determine the type, the working condition and the position coordinate of the device in the image to be detected. For example, a model obtained based on labeled sample supervised training raised in an invention "method and system for identifying power routine inspection images and power routine inspection unmanned aerial vehicle" with patent number CN201911065444.2 completes defect identification of power routine inspection images of the unmanned aerial vehicle.

The training samples needed by the model are usually gathered in clear day weather with a clear view and are annotated. However, with improvement of the protection level of the high voltage transmission line, the operational inspection system for a high voltage transmission line is adapted to detect the routine inspection images in cross-regional scenarios and various weather conditions (for example rainy days or foggy days). Unfortunately, it is either expensive or infeasible to collect enough annotated training samples in different regional scenarios or different weather. At the same time, under different regional scenario backgrounds or rainy days or foggy days, edge and color features caused by illumination, rain stripes, fog and fuzziness bring a significant domain difference among feature distribution of routine inspection images in different weather conditions. Such a domain difference or domain deviation will result in poor performance of the model in a new domain, i.e., it is hard to promote the operation and maintenance model with sample training in clear day to cross-regional routine inspection tasks or routine inspection tasks in other weather conditions.

SUMMARY

To overcome the above defects in the prior art, the objective of the present invention is to provide an operational inspection system and method for a domain adaptive device. Based on labeled samples in a source domain and unlabeled target domain samples in different scenario conditions, a feature extractor constructed by a convolutional neural network extracts features of different scales for information complementation so as to construct a plurality of groups of fusion features with similar semantic abstraction, and realize consistent multi-adversarial learning in combination with a hierarchical gradient reversal module and a multi-domain classification module, so as to promote the operational inspection model to learn domain semantic invariable feature expression to reduce distribution difference between the source domain and the target domain, so that the learned detection system has the domain adaptive device operational inspector with robustness in a domain adaptive task, thereby achieving operational inspection guarantee on the device operational inspection ability in the target domain same with that in the source domain in cross-regional or cross-weather scenarios.

The objective of the present invention is at least realized by one of the technical solutions as follows:

an operational inspection system for a domain adaptive device, including an image acquisition processing module, a weather condition classification module a domain adaptive device operational inspection module, wherein the domain adaptive device operational inspection module is configured to construct and predetermine a domain adaptive device operational inspection model, a domain adaptive device operational inspection model including a hierarchical feature extraction module, a fusion feature multi-aligning module, a region-of-interest generation module, a detector and a loss calculation module;

the image acquisition processing module is configured to acquire a routine inspection image of a transmission line device and pre-process the routine inspection image, and to send the pre-processed routine inspection image to the weather condition classification module and a domain adaptive feature extraction module;

the weather condition classification module is configured to construct and predetermine the weather condition classification model, the weather condition classification model is configured to identify a weather condition to which the route inspection image belongs and to input the routine inspection images under different weather conditions to the predetermined domain adaptive device operational inspection model under corresponding conditions according to a classification result;

the pre-processed routine inspection image is inputted into the hierarchical feature extraction module in the predetermined domain adaptive device operational inspection module, and features in a last layer are input into the region-of-interest generation module; and the region-of-interest generation module is configured to acquire a candidate region which may include features of an operational inspection object in the features in the last layer and to perform regional feature acquisition on the features in the last layer according to the candidate region; and the acquired regional features are input into the detector module for detection to obtain a detection prediction result, including a type, a working condition and a positioning coordinate of a detected device.

Further, the image acquisition processing module includes a clear day source domain input data processing module, a cross-regional clear day target domain data processing module, a rainy day condition target domain data synthesis module and a foggy day condition target domain data synthesis module required when the predetermined domain adaptive device operational inspection model is trained;

the clear day source domain input data processing module is configured to acquire the routine inspection image of the transmission line device in a clear day environment, i.e., a clear day image, to acquire an image set and to label the type, the working condition and the positioning coordinate of the corresponding target in the image, and to output a source domain data set $D_s$;

the cross-regional clear day target domain data processing module is configured to process the routine inspection image of the transmission line device in a region different from the source domain;

the source domain data set $D_s$ is inputted into the rainy day condition target domain data synthesis module to correspondingly execute a rainy data transmission line device routine inspection image synthesis and calculation module according to a task requirement;

the source domain data set $D_s$ is inputted into the foggy day condition target domain data synthesis module to correspondingly execute a foggy data transmission line device routine inspection image generation and calculation module according to a task requirement;

a target domain data set $D_t$ can be acquired by any one of the cross-regional clear day target domain data processing module, the rainy day condition target domain data synthesis module or the foggy day condition target domain data synthesis module, and the target domain set $D_t$ is unlabeled data, wherein the rainy data transmission line device routine inspection image synthesis and calculation module generates rainy day images by adopting an image synthesis technique, and the foggy data transmission line device routine inspection image generation and calculation module generates foggy day images by using a network.

Further, in the domain adaptive device operational inspection model, the hierarchical feature extraction module is implemented based on a deep convolutional network; the hierarchical feature extraction module is constructed as length and width scales of an output feature are respectively three scales corresponding to three different proportions (¼, ⅛, and ¹⁄₁₆) of the size of an input image, and the hierarchical feature extraction module includes a first feature extraction layer $l_1$, a second feature extraction layer $l_2$ and a third feature extraction layer $l_3$ in a serial relation and respectively outputs a first feature $f_1$, a second feature $f_2$ and a third feature $f_3$ with three different sizes including different information; the hierarchical feature extraction module inputs images and labels of the source domain data set $D_s$ and images of any one target domain data set $D_t$ and outputs a first source domain feature $f_1^s$, a second source domain feature $f_2^s$, a third source domain feature $f_3^s$ and a first target domain feature $f_1^t$, a second target domain feature $f_2^t$ and a third target domain feature $f_3^t$, including different information, of different sizes; and a VGG16 network, but not limited thereto, can be used as a basic feature extraction network.

Further, the fusion feature multi-aligning module includes a hierarchical gradient reversal calculation module, a cross-layer contextual information fusion module and a multi-domain classification module, and is configured to implement consistent multi-adversarial learning, and prompts the domain adaptive device operational inspection module to learn domain semantic invariable feature expression based on the fusion features, so as to reduce distributional difference of the source domains and the target domains.

The hierarchical gradient reversal calculation module includes a first gradient reversal calculation unit $GRL_1$, a second gradient reversal calculation unit $GRL_2$ and a third gradient reversal calculation unit $GRL_3$, and is configured to convert a gradient value required into an opposite number of the gradient value when optimized parameters are propagated backwards in a training process and not to calculate the input feature pattern when the optimized parameters are propagated forwards; the first source domain feature $f_1^s$ and the first target domain feature $f_1^t$ are inputted into the first gradient reversal calculation unit $GRL_1$, so as to output the first source domain feature $f_{11}^s$ subjected to reversal calculation and the first target domain feature $f_{11}^t$ subjected to reversal calculation; the second source domain feature $f_2^s$ and the second target domain feature $f_2^t$ are inputted into the second gradient reversal calculation unit $GRL_2$, so as to output the second source domain feature $f_{22}^s$ subjected to reversal calculation and the second target domain feature $f_{22}^t$ subjected to reversal calculation; and the third source domain feature $f_3^s$ and the third target domain feature $f_3^t$ are inputted into the third gradient reversal calculation unit $GRL_3$, so as to output the third source domain feature $f_{33}^s$ subjected to reversal calculation and the third target domain feature $f_{33}^t$ subjected to reversal calculation.

The cross-layer contextual information fusion module includes feature nondestructive deformation calculation and cross-layer fusion calculation; the feature nondestructive deformation calculation used for respectively executing scale consistency deformation calculation without discarded feature information on the first source domain feature $f_{11}^s$ subjected to reversal calculation, the second source domain feature $f_{22}^s$ subjected to reversal calculation, the first target domain feature $f_{11}^t$ subjected to reversal calculation and the second target domain feature $f_{22}^t$ subjected to reversal calculation, outputted by the hierarchical gradient reversal calculation module according to the feature scales of the third source domain feature $f_{33}^s$ subjected to reversal calculation and the third target domain feature $f_{33}^t$ subjected to reversal calculation, with a calculating function as follows:

$$F_{(c,h,w)}' = F_{(c*s^2, h/s, w/s)};$$

where c is a channel quantity of feature pattern, w and h are respectively width and height of the feature pattern, s is an order of magnitudes of scale variation, the order of magnitudes of scale variation s includes one or more of 2, 4 or ½ and ¼, wherein the first source domain feature $f_{11}^s$ subjected to reversal calculation and the second source domain feature $f_{22}^s$ subjected to reversal calculation are subjected to feature nondestructive deformation to obtain $f_1^{s'}$ and $f_2^{s'}$; the cross-layered fusion calculation is used for executing cross-layer fusion calculation on the feature pattern with consistent scale to obtain a contextual information enhanced fusion feature; a method for the cross-layer fusion calculation includes one of splicing, adding, multiplying and vector product; scale consistency operation and fusion calculation are performed on a feature that is outputted by the first gradient reversal calculation unit $GRL_1$, the second gradient reversal calculation unit $GRL_2$ and the third gradient reversal calculation unit $GRL_3$ and inputted into cross-layer contextual information infusion module, so as to construct a strong semantic fusion feature; $f_1^{s'}$ is fused to the second source domain feature $f_{22}^s$ subjected to reversal calculation to output a first source domain fusion feature $g_1^s$, $f_2^{s'}$ is fused to the third source domain feature $f_{33}^s$ subjected to reversal calculation to output a second source domain fusion feature $g_2^s$, the third source domain feature $f_{33}^s$ subjected to reversal calculation is fused to $f_1^{s'}$ to output a third source domain fusion feature $g_3^s$, and a same fusion policy is performed by a target domain hierarchical feature to output a first target domain fusion feature $g_1^t$, a second target domain fusion feature $g_2^t$ and the third target domain fusion feature $g_3^t$.

The multi-domain classification module includes three domain classification sub-networks $G_d^k$ and k=1, 2, 3 to predict whether the source domain fusion features and the target domain fusion features either belong to the source domain data set $D_s$ or belong to the target domain data set $D_t$; the first source domain fusion feature $g_1^s$ and the first target domain fusion feature $g_1^t$ are inputted into the first domain classification sub-network $G_d^1$ to output prediction results $y_1^s$ and $y_1^t$, the fusion features $g_2^s$ and $g_2^t$ are similarly operated as an input of the second domain classification sub-network $G_d^2$ to output prediction results $y_2^s$ and $y_2^t$, and the fusion features $g_3^s$ and $g_3^t$ are similarly operated as an input of the third domain classification sub-network $G_d^3$ to output prediction results $y_3^s$ and $y_3^t$, and a multi-domain classification loss function defined as follows:

$$L_{G_d^k}(G_d^k,F)=\Sigma_{f_c^s \sim D_s} \log(G_d^k(g_c^s))+\Sigma_{f_c^t \sim D_t} \log(1-G_d^k(g_c^t));$$

where $g_c^s$ is the source domain fusion feature, $g_c^t$ is the target domain fusion feature c=1, 2, 3, F represents a hierarchical feature extraction mode, and $L_{G_d^k}$ is the multi-domain classification loss function; and consistency constraint is performed on the three domain classification sub-networks $G_d^k$ in the multi-domain classification module, such that the calculation loss value of each domain classification sub-network keeps consistency of an adjustment range of network parameters, so as to prompt learning of domain invariable feature expression in multi-adversarial learning, and a a loss function for consistency constraint of the domain classification sub-networks defined as follows:

$$L_{con}(G_d^1,G_d^2,G_d^3)=\Sigma_{i,j=1,2,3}\|G_d^i(g_i^s)-G_d^j(g_j^s)\|+\Sigma_{i,j=1,2,3}\|G_d^i(g_i^t)-G_d^j(g_j^t)\|.$$

Further, the region-of-interest generation module is mainly configured to determine whether objects in k anchors included in pixel points of an original image corresponding to the second source domain feature $f_{33}^s$ subjected to reversal calculation are targets or backgrounds; as labeled samples in the source domain are subjected to supervised training, the region-of-interest generation module is capable of generating p regions-of-interest for the second source domain feature $f_{33}^s$ subjected to reversal calculation, each of the regions-of-interest including a foreground, i.e., the target or the background; corresponding positions of the second source domain feature $f_{33}^s$ subjected to reversal calculation was tailored based on the generated regions-of-interest to output p region-of-interest feature patterns; and the detector module includes a head network, a device working condition identifier and a device positioner which are respectively configured to input the p region-of-interest feature patterns and label information for predicting types, working conditions and positioning coordinates of a plurality of devices, to calculate classification prediction loss values based on a cross entropy loss function $L_{cls}$ and to calculate coordinate prediction loss values based on a smooth L1 loss function $L_{bbox}$; and the loss calculation module includes a multi-domain classification loss function $L_{G_d^k}$, a consistency constraint loss function $L_{con}$, a classification loss function $L_{cls}$ and a coordinate prediction loss function $L_{bbox}$.

Further, in the domain adaptive device operational inspection module, after the domain adaptive device operational inspection module is constructed, detector module training and consistent multi-adversarial training on the fusion feature multi-aligning module are conducted synchronously, including forward propagation calculation and backward parameter update;

the forward propagation calculation means that the source domain and the target module enter the hierarchical feature extraction module simultaneously to output hierarchical features, the hierarchical features passing through the hierarchical gradient reversal calculation module are inputted into a plurality of groups of fusion features outputted by the cross-layer contextual information fusion module, the multi-domain classification module conducts domain classification predicted values on the inputted plurality of groups of fusion features and calculate multi-domain classification loss $L_{G_d^k}$, constrains predicted output of the domain classification sub-network through the consistency constraint of the domain classification sub-network and calculates the consistency loss $L_{con}$, and meanwhile, the detector module predicts the hierarchical features in the last layer of the source domain and calculates the classification loss $L_{cls}$ and the coordinate prediction loss $L_{bbox}$;

the back parameter update means that parameters of the constructed domain adaptive device operational inspection model are updated based on a back propagation algorithm; the network parameters $\theta_d^k$ of the domain classification sub-network $G_d^k$ are updated by a domain classification gradient value calculated by a predicted loss of the domain classification sub-network; gradient reversal calculation is conducted when the domain classification gradient value is propagated backwards to the hierarchical gradient reversal calculation module, i.e., the gradient value is calculated as the opposite number of the gradient value itself to continuously update parameters $\theta_f$ of the hierarchical feature extraction module; and meanwhile, the parameters $\theta_f$ of the hierarchical feature extraction module are synchronously updated by the classification and positioning gradient values calculated by the classification and positioning losses of the detector module, wherein network updating calculation is defined as follows:

$$\theta_d^k \leftarrow \theta_d^k - \mu \left( \frac{\partial L_{G_d^k+}}{\partial \theta_d^k} + \frac{\partial L_{con+}}{\partial \theta_d^k} \right)$$

$$\theta_F \leftarrow \theta_F - \mu \left( \frac{\partial L_{cls+}}{\partial \theta_F} + \frac{\partial L_{bbox+}}{\partial \theta_F} + \frac{\partial L_{G_d^k-}}{\partial \theta_F} \right)$$

where $L_{G_d^{k_+}}$ represents the minimum multi-domain classification loss, μ represents the learning rate, $L_{G_d^{k_+}}$ represents the minimum multi-domain classification loss, so that the domain classification sub-module can differentiate whether the domain samples are from the source domain or the target domain, $L_{G_d^{k_-}}$ represents the maximum multi-domain classification loss to draw distribution of the source domain close to distribution of the target domain, $L_{con+}$ represents the minimum consistency loss of the domain classification sub-network, $\theta_d^k$ and $\theta_F$ are optimized in a united manner to achieve consistent multi-adversarial leaning to promote the domain adaptive device operational inspection model to learn domain semantic invariable feature expression so as to reduce the distribution difference of the source domain and the target domain, such that the domain adaptive device operational inspection model has a stronger generalization ability; $L_{cls+}$ represents the minimum classification loss, $L_{bbox+}$ represents the minimum coordinate prediction loss, and the trained predetermined domain adaptive device operational inspection model is acquired by iterative optimization; and one or more predetermined domain adaptive device operational inspection models can be acquired by inputting the training target domain data sets under different conditions.

Further, the weather condition classification model includes a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and a clear day image, a rainy day image and a foggy day image obtained in the image acquisition processing module are inputted into the weather condition classification model for training to obtain the trained predetermined weather condition classification model.

An operational inspection method for a domain adaptive device, including the following steps:

S1: Using an image acquisition processing module, to acquire a routine inspection image to be detected of a transmission line, and pre-processing the image;

S2: inputting the routine inspection image to be detected into a predetermined weather condition classification model to identify the weather condition to which the routine inspection image belongs, so as to obtain a weather condition classification result;

S3: selecting a corresponding predetermined domain adaptive device operational inspection model according to the weather condition classification result; and S4: inputting the routine inspection image to be detected into the predetermined domain adaptive device operational inspection model to obtain a detection result of the routine inspection image to be detected, wherein the detection result includes one or a combination of more of the device type, the working condition and the position information of a detection object in the routine inspection image to be detected.

Compared with the prior art, the present invention has the beneficial technical effects:

according to the method, the above mode promotes the operational inspection model to learn domain semantic invariable feature expression to reduce distribution difference between the source domain and the target domain, so that the obtained domain adaptive device operational inspection model has a stronger generalization ability; a sample to be detected of the operational inspection system for the adaptive device in a high voltage transmission line domain is not constrained by sample label and domain or the weather condition, and meanwhile, the operational inspection result of the device in a target domain in a domain adaptive scenario has detection performance identical to that in a source domain.

DETAILED DESCRIPTION OF EMBODIMENTS

The technical solution is illustrated in the description below in combination with specific illustration for fully understanding the present invention. However, the present invention can be implemented by other methods different from the method described herein. Similar embodiments of promotion made by those of ordinary skill in the art without making creative efforts fall into the scope of protection of the present invention.

The terms used in the description are merely for the purpose of describing specific embodiments rather than limiting the description. The singular forms such as "a", "said" and "the" used in one or more embodiments and the appended claims of the description are also intended to include the plural forms, unless otherwise clearly stated in the context. It should also be understood that the term "and/or" used in one or more embodiments refers to and includes any of one or more of the associated listed items or all possible combinations.

It should be understood that although the terms such as first and second may be used to describe various information in one or more embodiments of the description, the information should not be limited to the terms. These terms are merely used for distinguishing similar objects and not necessarily used for sequential order or order of features described in the one or embodiments of the description. In addition, terms "have", "include" and similar expressions are intended to describe and cover a non-exclusive range, for example, process, method, system, product or device including a series of steps or modules are not necessarily limited to the contents listed in detail but may include inherent contents involved in these steps or modules not listed.

First of all, professional terms designed in one or more embodiments of the present invention are explained.

Routine inspection for high voltage transmission line: the terminal device periodically acquires and detects images of key devices of the high voltage transmission line to judge the working conditions of the related devices such as normal glass insulators, normal composite insulators, normal shock-proof hammers, normal wire inlet clamps, bird nests, abnormal glass insulators and abnormal composite insulators.

Routine inspection images of the device for the high voltage transmission line: the images acquired by the device are acquired by the routine inspection terminal device. The routine inspection terminal device involved in the present invention is not limited to the image acquisition device of the unmanned aerial vehicle. The devices capable of being implemented by a camera device all fall into the scope of protection of the present invention.

Embodiment

Figure 1:
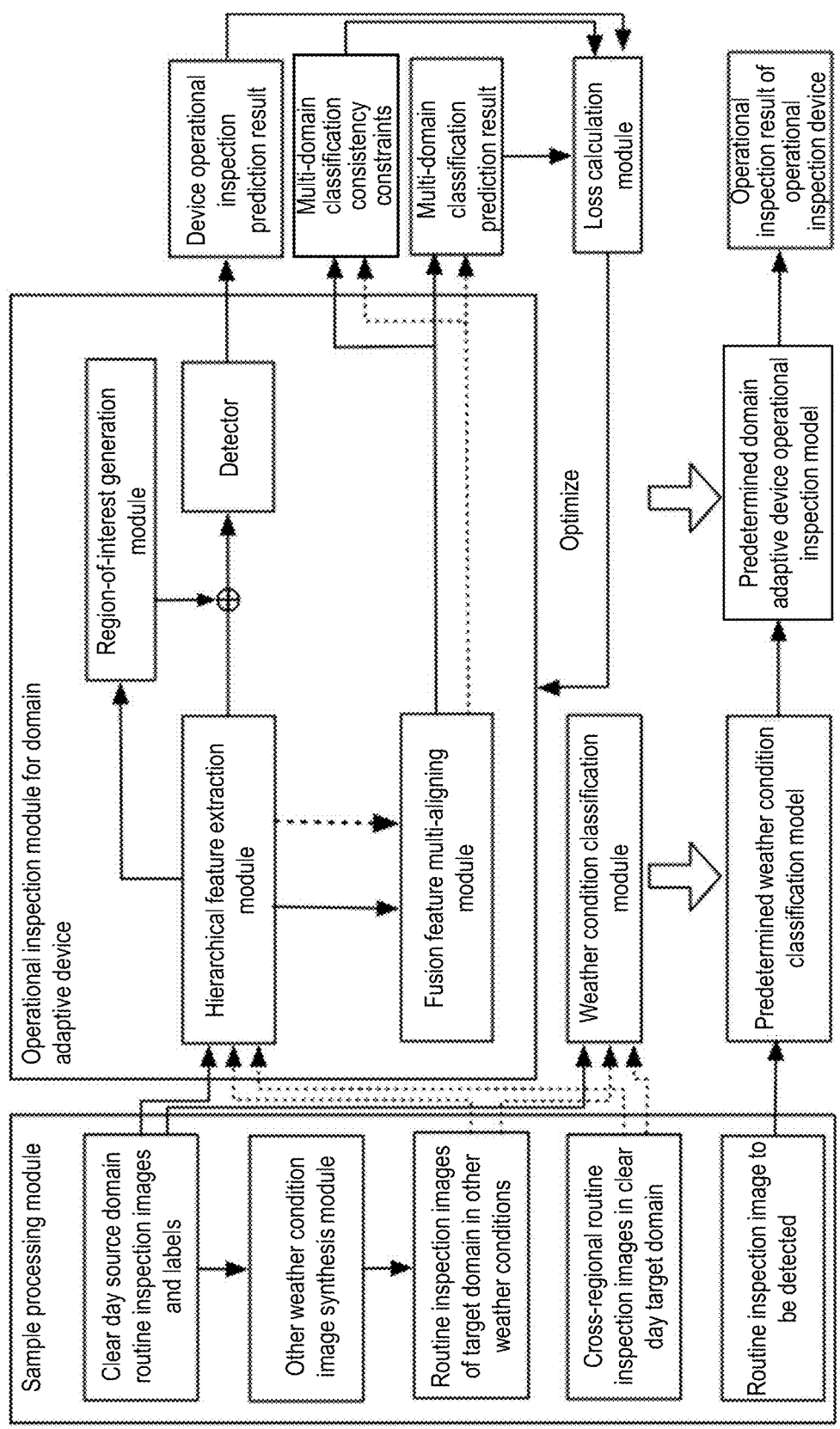
FIG. 1 is a schematic diagram of an operational inspection system for a domain adaptive device provided in an embodiment of the present invention.

In the embodiment, an operational inspection system for a domain adaptive device, as shown in FIG. 1, includes an image acquisition processing module, a weather condition classification module a domain adaptive device operational inspection module,
- wherein the domain adaptive device operational inspection module is configured to construct and predetermine a domain adaptive device operational inspection model, the domain adaptive device operational inspection model including a hierarchical feature extraction module, a fusion feature multi-aligning module, a region-of-interest generation module, a detector and a loss calculation module;
- the image acquisition processing module is configured to acquire a routine inspection image of a transmission line device and pre-process the routine inspection image, and to send the pre-processed routine inspection image to the weather condition classification module and a domain adaptive feature extraction module;
- the weather condition classification module is configured to construct and predetermine the weather condition classification model, the weather condition classification model is configured to identify a weather condition to which the route inspection image belongs and to input the routine inspection images to be detected under different weather conditions to the predetermined domain adaptive device operational inspection model under corresponding conditions according to a classification result;
- the pre-processed routine inspection image is inputted into the hierarchical feature extraction module in the predetermined domain adaptive device operational inspection module, and features in the last layer are input into the region-of-interest generation module; and the region-of-interest generation module is configured to acquire a candidate region which may include features of an operational inspection object in the features in the last layer and to perform regional feature acquisition on the features in the last layer according to the candidate region; and the obtained regional features are input into the detector module for detection to obtain a detection prediction result that includes a type, a working condition and a positioning coordinate of a detected device.

The image acquisition processing module includes a clear day source domain input data processing module, a cross-regional clear day target domain data processing module, a rainy day condition target domain data synthesis module and a foggy day condition target domain data synthesis module required when the predetermined domain adaptive device operational inspection model is trained;

- the clear day source domain input data processing module is configured to acquire the routine inspection image of the transmission line device in a clear day environment, i.e., a clear day image, to acquire an image set and label the type, the working condition and the positioning coordinate of the corresponding target in the image, such as normal glass insulators, normal composite insulators, normal shock-proof hammers, normal wire inlet clamps, bird nests, abnormal glass insulators and abnormal composite insulators, and to output a source domain data set $D_s$;
- the cross-regional clear day target domain data processing module is configured to process the routine inspection image of the transmission line device in a region different from the source domain;
- the source domain data set $D_s$ is inputted into the rainy day condition target domain data synthesis module to correspondingly execute a rainy data transmission line device routine inspection image synthesis and calculation module according to a task requirement;
- the source domain data set $D_s$ is inputted into the foggy day condition target domain data synthesis module to correspondingly execute a foggy data transmission line device routine inspection image generation and calculation module according to a task requirement;
- a target domain data set $D_t$ can be acquired by any one of the cross-regional clear day target domain data processing module, the rainy day condition target domain data synthesis module or the foggy day condition target domain data synthesis module, and the target domain set $D_t$ is unlabeled data, wherein the rainy data transmission line device routine inspection image synthesis and calculation module generates rainy day images by adopting an image synthesis technique, and in the embodiment, the foggy data transmission line device routine inspection image generation and calculation module generates foggy day images by using a generation network cyclegan.

Figure 3:
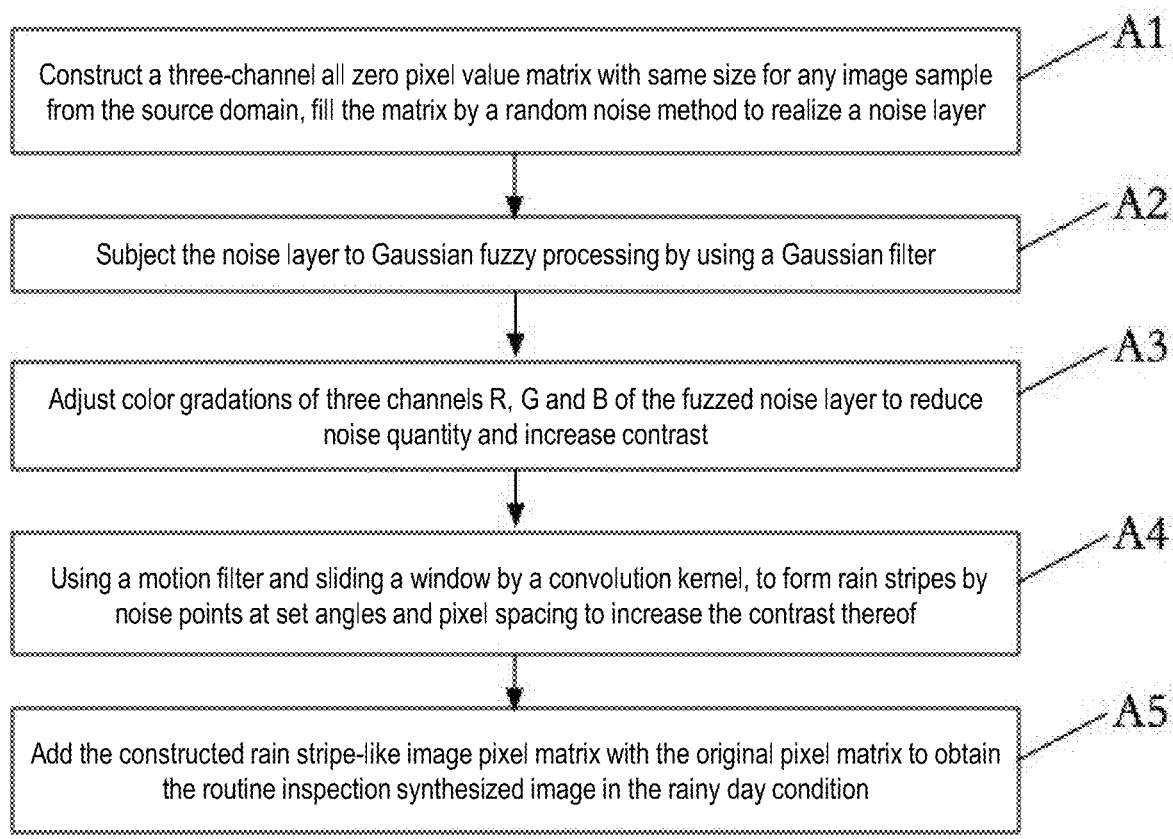
FIG. 3 is a schematic diagram of synthetic steps for samples in a rainy day target domain in the embodiment of the present invention.
Figure 4:
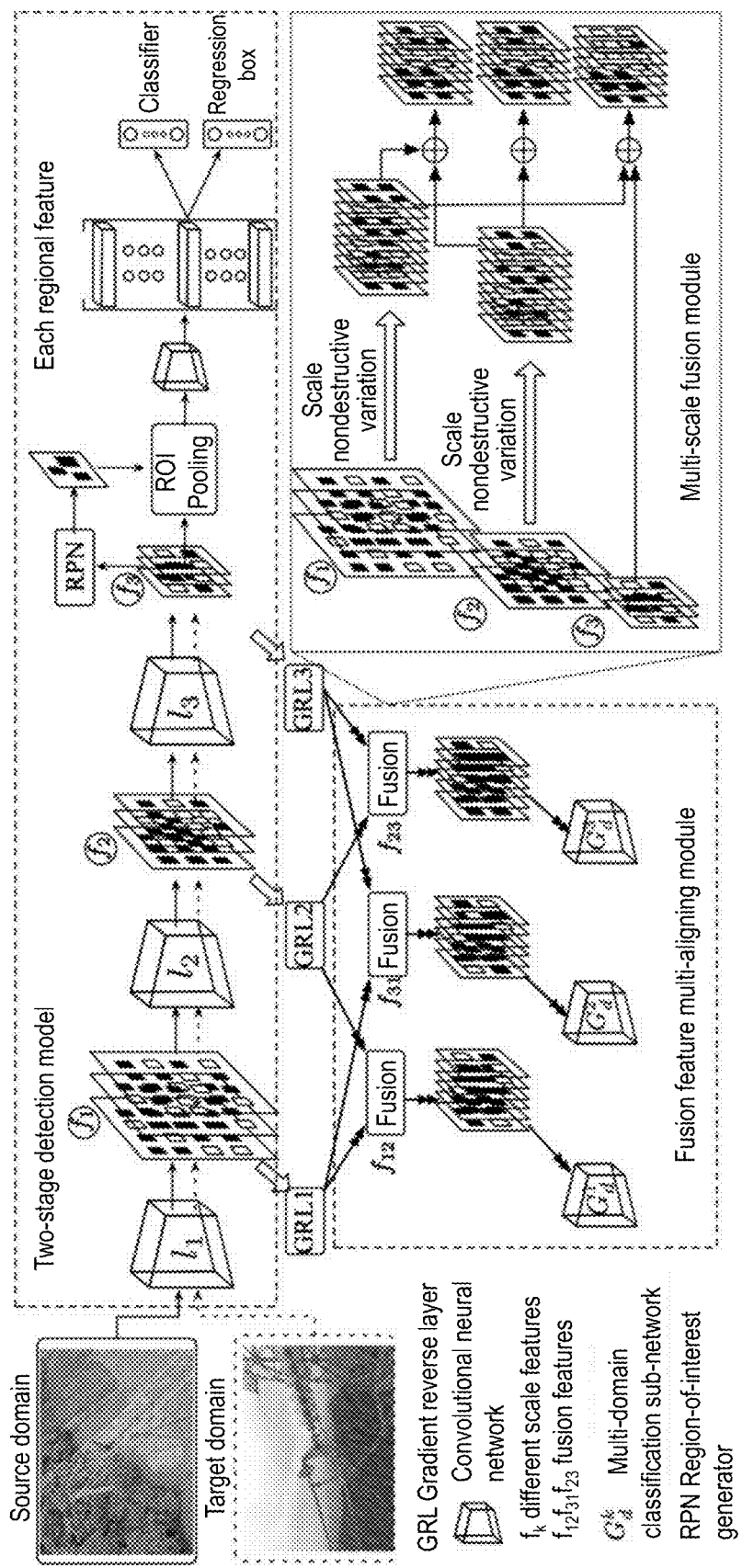
FIG. 4 is a structural schematic diagram of the domain adaptive device operational inspection model in the embodiment of the present invention.

In the embodiment, by taking the rainy day condition as an example, the synthetic steps for the rainy day images are shown in FIG. 3, including the following steps:

A1: a three-channel all zero pixel value matrix with same size is constructed for any image from the source domain data set $D_s$, and random pixel values fill the matrix by a random noise method to realize a random noise layer $p_z(z)$;

A2: the noise layer constructed in A2 is subjected to Gaussian fuzzy processing by using a Gaussian filter, with a filter function as follows:

$$G(x, y) = \frac{1}{2\pi\sigma^2} e^{-\frac{x^2+y^2}{2\sigma^2}};$$

where x is a distance from horizontal axis of the image to the origin, y is a distance from longitudinal axis of the image to the origin, and σ is a standard deviation of Gaussian distribution;

A3: based on the image calculated in A2, color gradations of three channels R, G and B are adjusted independently to reduce noise quantity and increase contrast;

A4: a motion filter is constructed, a window is slided by a convolution kernel, which is adapted to form rain stripes by noise points generated in A3 at set angles and pixel spacing, and the A3 is repeated to increase the contrast;

A5: the rain stripe image pixel matrix constructed in A4 is added with the original image pixel value matrix from the source domain data set $D_s$ in A1, and iteration is executed for the number of times of images in the source domain data set $D_s$ to finally output the target domain data set $D_t$ in the rainy day condition;

As shown in FIG. 4, in the domain adaptive device operational inspection model in the embodiment, the hierarchical feature extraction module is implemented based on a deep convolutional network VGG16; the hierarchical feature extraction module is constructed as length and width scales of an output feature are respectively three scales ¼, ⅛ and ¹⁄₁₆ corresponding to three different proportions of the size of an input image, and the obtained first feature extraction layer $l_1$ includes the first convolutional network layer to the $16^{th}$ maximum pooling layer, the second feature extraction layer $l_2$ includes the $17^{th}$ convolutional network layer to the $24^{th}$ maximum pooling layer, and the third feature extraction layer $l_3$ includes the $25^{th}$ convolutional network layer to the $31^{st}$ Rule activating layer, and the first feature extraction layer $l_1$, the second feature extraction layer $l_2$ and the third feature extraction layer $l_3$ in a serial relation respectively outputs a first feature $f_1$, a second feature $f_2$ and a third feature $f_3$ with three different sizes including different information; in the embodiment, the size of the input image is 600*1200, the feature size of $f_1$ is 150*300, the feature size of $f_2$ is 75*150 and the feature size of $f_3$ is 37*75; the hierarchical feature extraction module inputs images and labels of the source domain data set $D_s$ and images of any one target domain data set $D_t$ and outputs a first source domain feature $f_1^s$, a second source domain feature $f_2^s$, a third source domain feature $f_3^s$ and a first target domain feature $f_1^t$, a second target domain feature $f_2^t$ and a third target domain feature $f_3^t$, including different information, of different sizes;

the fusion feature multi-aligning module includes a hierarchical gradient reversal calculation module, a cross-layer contextual information fusion module and a multi-domain classification module, and is configured to implement consistent multi-adversarial learning, and prompts the domain adaptive device operational inspection module to learn domain semantic invariable feature expression based on the fusion features, so as to reduce distributional difference of the source domains and the target domains;

the hierarchical gradient reversal calculation module includes a first gradient reversal calculation unit $GRL_1$, a second gradient reversal calculation unit $GRL_2$ and a third gradient reversal calculation unit $GRL_3$, and is configured to convert a gradient value needed into an opposite number of the gradient value itself when optimized parameters are propagated backwards in a training process and not to calculate the input feature pattern when the optimized parameters are propagated forwards; the first source domain feature $f_1^s$ and the first target domain feature $f_1^t$ are inputted into the first gradient reversal calculation unit $GRL_1$, so as to output the first source domain feature $f_{11}^s$ subjected to reversal calculation and the first target domain feature $f_{11}^t$ subjected to reversal calculation; the second source domain feature $f_2^s$ and the second target domain feature $f_2^t$ are inputted into the second gradient reversal calculation unit $GRL_2$, so as to output the second source domain feature $f_{22}^s$ subjected to reversal calculation and the second target domain feature $f_{22}^t$ subjected to reversal calculation; and the third source domain feature $f_3^s$ and the third target domain feature $f_3^t$ are inputted into the third gradient reversal calculation unit $GRL_3$, so as to output the third source domain feature $f_{33}^s$ subjected to reversal calculation and the third target domain feature $f_{33}^s$ subjected to reversal calculation.

The cross-layer contextual information fusion module includes feature nondestructive deformation calculation and cross-layer fusion calculation; the feature nondestructive deformation calculation is used for respectively executing scale consistency deformation calculation without discarded feature information on the first source domain feature $f_{11}^s$, subjected to reversal calculation, the second source domain feature $f_{22}^s$ subjected to reversal calculation, the first target domain feature $f_{11}^t$ subjected to reversal calculation and the second target domain feature $f_{22}^t$ subjected to reversal calculation, outputted by the hierarchical gradient reversal calculation module according to the feature scales of the third source domain feature $f_{33}^s$ subjected to reversal calculation and the third target domain feature $f_{33}^t$ subjected to reversal calculation, and a calculating function is as follows:

$$F_{(c,h,w)}' = F_{(c*s^2, h/s, w/s)};$$

where c is a channel quantity of the feature pattern, w and h are respectively width and height of the feature pattern, s is the order of magnitudes of scale variation, the order of magnitudes of scale variation s includes one or more of 2, 4 or ½ and ¼, wherein the first source domain feature $f_{11}^s$ subjected to reversal calculation and the second source domain feature $f_{22}^s$ subjected to reversal calculation are subjected to feature nondestructive deformation to obtain $f_1^{s'}$ and $f_2^{s'}$; the cross-layered fusion calculation is used for executing cross-layer fusion calculation on the feature pattern with consistent scale to obtain a contextual information enhanced fusion feature; a method for the cross-layer fusion calculation includes one of splicing, adding, multiplying and vector product; scale consistency operation and fusion calculation are performed on a feature that is outputted by the first gradient reversal calculation unit $GRL_1$, the second gradient reversal calculation unit $GRL_2$ and the third gradient reversal calculation unit $GRL_3$ and inputted into the cross-layer contextual information infusion module, so as to construct a strong semantic fusion feature; $f_1^{s'}$ is fused to the second source domain feature $f_{22}^s$ subjected to reversal calculation to output a first source domain fusion feature $g_1^s$, $f_2^{s'}$ is fused to the third source domain feature $f_{33}^s$ subjected to reversal calculation to outputs a second source domain fusion feature $g_2^s$, the third source domain feature $f_{33}^s$ subjected to reversal calculation is fused to $f_1^{s'}$ to output a third source domain fusion feature $g_3^s$, and a same fusion policy is performed by a target domain hierarchical feature to output a first target domain fusion feature $g_1^t$, a second target domain fusion feature $g_2^t$ and the third target domain fusion feature $g_3^t$.

The multi-domain classification module includes three domain classification sub-networks $G_d^k$ and k=1, 2, 3, each of the domain classification sub-networks includes three 1*1 fully convolutional layers arranged in sequence to predict whether the source domain fusion feature and the target domain fusion feature belong to the source domain data set $D_s$ or the target domain data set $D_t$. In the embodiment, a detailed structure of the domain classification sub-network is shown in table 1 and table 2 below;

TABLE 1

$G_d^1$, $G_d^3$ Parameter table of multi-domain classification sub-network model

| Sequence number | Layer name | Core size | Step length | Number of convolution kernels | Input | Output |
|---|---|---|---|---|---|---|
| 1 | Convolutional + ReLU | 1*1 | 1 | 1 | 768*37*75 | 512*37*75 |
| 2 | Convolutional + ReLU | 1*1 | 1 | 1 | 512*37*75 | 512*37*75 |
| 3 | Convolutional + softmax | 1*1 | 1 | 1 | 512*37*75 | 2*37*75 |

TABLE 2

$G_d^2$ Parameter table of multi-domain classification sub-network model

| Sequence number | Layer name | Core size | Step length | Number of convolution kernels | Input | Output |
|---|---|---|---|---|---|---|
| 1 | Convolutional + ReLU | 1*1 | 1 | 1 | 1024*37*75 | 512*37*75 |
| 2 | Convolutional + ReLU | 1*1 | 1 | 1 | 512*37*75 | 512*37*75 |
| 3 | Convolutional + softmax | 1*1 | 1 | 1 | 512*37*75 | 2**37*75 |

The first source domain fusion feature $g_1^s$ and the first target domain fusion feature $g_1^t$ are inputted into the first domain classification sub-network $G_d^1$ to output prediction results $y_1^s$ and $y_1^t$, the fusion features $g_2^s$ and $g_2^t$ are similarly operated as an input of the second domain classification sub-network $G_d^2$ to output prediction results $y_2^s$ and $y_2^t$, and the fusion features $g_3^s$ and $g_3^t$ are similarly operated as an input of the third domain classification sub-network $G_d^3$ to output prediction results $y_3^s$ and $y_3^t$; In the embodiment, the domain label of all source domains is set as 1, and the domain label of all target domains is set as 0. A binary classification loss function is used as a domain classification network optimization target, with the multi-domain classification loss function defined as follows:

$$L_{G_d^k}(G_d^k, F) = \Sigma_{f_c^s - D_s} \log(G_d^k(g_c^s)) + \Sigma_{f_c^t - D_t} \log(1 - G_d^k(g_c^t))$$

where $g_c^s$ is the source domain fusion feature, $g_c^t$ is the target domain fusion feature (c=1,2,3,), F represents the hierarchical feature extraction mode, and $L_{G_d^k}$ is the multi-domain classification loss function; and consistency constraint is performed on the three domain classification sub-networks $G_d^k$ in the multi-domain classification module, such that the calculation loss value of each domain classification sub-network keeps consistency of an adjustment range of network parameters, so as to prompt learning of domain invariable feature expression in multi-adversarial learning, wherein a loss function for constraint of the domain classification sub-networks is defined as follows:

$$L_{con}(G_d^1, G_d^2, G_d^3) = \Sigma_{i,j=1,2,3} \|G_d^i(g_i^s) - G_d^j(g_j^s)\| + \Sigma_{i,j=1,2,3} \|G_d^i(g_i^t) - G_d^j(g_j^t)\|;$$

the region-of-interest generation module RPN is mainly configured to determine whether objects in k anchors included in pixel points of an original image corresponding to the feature value of the feature pattern of the second source domain feature $f_{33}^s$ subjected to reversal calculation are targets or backgrounds; as labeled samples in the source domain are subjected to supervised training, the region-of-interest generation module is capable of generating p (for example 256) regions-of-interest for the routine inspection image to be detected, each of the regions-of-interest including a foreground, i.e., the target or the background; corresponding positions of the second source domain feature $f_{33}^s$ subjected to reversal calculation was tailored based on the generated regions-of-interest to output 256 region-of-interest feature patterns with the feature size of 7*7; and the detector module includes a head network, a device working condition identifier and a device positioner which are respectively configured to input a candidate box region and the second source domain feature $f_{33}^s$ subjected to reversal calculation and label information for predicting the types, the working conditions and the positioning coordinates of a plurality of devices, to calculate classification prediction loss values based on a cross entropy loss function $L_{cls}$ and to calculate coordinate prediction loss values based on a smooth L1 loss function $L_{bbox}$; and the loss calculation module includes a multi-domain classification loss function $L_{G_d^k}$, a consistency constraint loss function $L_{con}$, a classification loss function $L_{cls}$ and a coordinate prediction loss function $L_{bbox}$.

Figure 2:
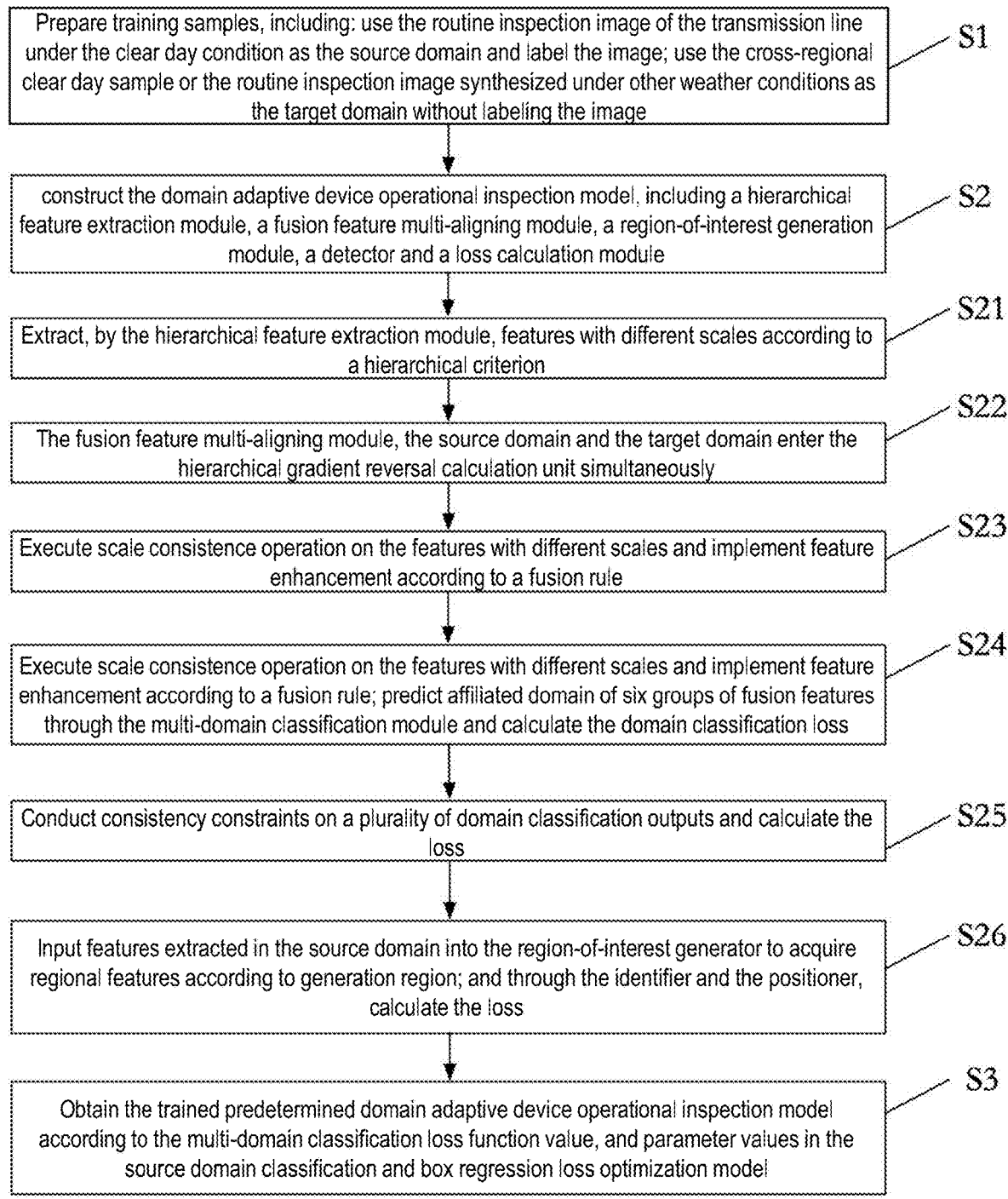
FIG. 2 is a schematic diagram of training steps of a predetermined domain adaptive device operational inspection model in the embodiment of the present invention.

Further, after the domain adaptive device operational inspection module is constructed, the training process is shown in FIG. 2: detector module training and consistent multi-adversarial training on the fusion feature multi-aligning module are conducted synchronously, including forward propagation calculation and backward parameter update;

the forward propagation calculation means that the source domain and the target module enter the hierarchical feature extraction module simultaneously to output hierarchical features, the hierarchical features passing through the hierarchical gradient reversal calculation module are inputted into a plurality of groups of fusion features outputted by the cross-layer contextual information fusion module, the multi-domain classification module conducts domain classification predicted values on the inputted plurality of groups of fusion features and calculate multi-domain classification loss $L_{G_d^k}$, constrains predicted output of the domain classification sub-network through the consistency constraint of the domain classification sub-network and calculates the consistency loss $L_{con}$, and meanwhile, the detector module predicts the hierarchical features in the last layer of the source domain and calculates the classification loss $L_{cls}$ and the coordinate prediction loss $L_{bbox}$; the back parameter update means that parameters of the constructed domain adaptive device operational inspection model are updated based on a back propagation algorithm; the network parameters $\theta_d^k$ of the domain classification sub-network $G_d^k$ are updated by a domain classification gradient value calculated by a predicted loss of the domain classification sub-network; gradient reversal calculation is conducted when the domain classification gradient value is propagated backwards to the hierarchical gradient reversal calculation module, i.e., the gradient value is calculated as the opposite number of the gradient value itself to continuously update parameters $\theta_f$ of the hierarchical feature extraction module; and meanwhile, the parameters $\theta_f$ of the hierarchical feature extraction module are synchronously updated by the classification and positioning gradient values calculated by the classification and positioning losses of the detector module, wherein network updating calculation is defined as follows:

$$\theta_d^k \leftarrow \theta_d^k - \mu \left( \frac{\partial L_{G_d^k+}}{\partial \theta_d^k} + \frac{\partial L_{con+}}{\partial \theta_d^k} \right)$$

$$\theta_F \leftarrow \theta_F - \mu \left( \frac{\partial L_{cls+}}{\partial \theta_F} + \frac{\partial L_{bbox+}}{\partial \theta_F} + \frac{\partial L_{G_d^k-}}{\partial \theta_F} \right)$$

where $L_{G_d^k+}$ represents the minimum multi-domain classification loss, μ represents the learning rate, $L_{G_d^k+}$ represents the minimum multi-domain loss, such that the domain classification sub-module can differentiate whether the domain samples are from the source domain or the target domain, $L_{G_d^k-}$ represents the maximum multi-domain classification loss to zoom in distribution of the source domain and the target domain, $L_{con+}$ represents the minimum consistency loss of the domain classification sub-network, $\theta_d^k$ and $\theta_F$ are optimized in a united manner to achieve consistent multi-adversarial leaning to promote the domain adaptive device operational inspection model to learn domain semantic invariable feature expression so as to reduce the distribution difference of the source domain and the target domain, so that the domain adaptive device operational inspection model has a stronger generalization ability; $L_{cls+}$ represents the minimum classification loss, $L_{bbox+}$ represents the minimum coordinate prediction loss, and the trained predicted domain adaptive device operational inspection model is acquired by iterative optimization; and one or more predicted domain adaptive device operational inspection models can be acquired by inputting the training target domain data sets under different conditions. In the embodiment, the number of batches of samples iterated each time is 2, wherein one of the batches is from the source domain data set and the other batch is from the target domain data set. The previous 50 k iterative learning rate is set as 1 $e^{-2}$, the later 20 k iterative learning rate is set as 1 $e^{-4}$, and subjected to 70 k iteration totally, and then the trained predetermined domain adaptive device operational inspection model is obtained.

As shown in table 3, by taking the samples in the rainy day weather condition as an example in the embodiment, compared with the detection result of the obtained domain adaptive device operational inspection model, the domain adaptive-free operational inspection model (the operational inspection model trained with the samples in the clear day condition is used for detection directly) is significantly improved.

TABLE 3

| Method | Normal glass insulator | Normal composite insulator | Normal shock-proof hammer | Normal wire inlet clamp | Bird nest | Destructed insulator | mAP |
|---|---|---|---|---|---|---|---|
| Domain adaptive-free | 74.2% | 64.8% | 25.8% | 20.1% | 47.6% | 63.9% | 49.4% |
| The embodiment | 90.4% | 90.2% | 47.7% | 57.8% | 100.0% | 90.3% | 79.4% |

The weather condition classification model includes a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and in the weather condition classification module, a clear day image, a rainy day image and a foggy day image obtained in the image acquisition processing module are inputted into the weather condition classification model for training to obtain the trained predetermined weather condition classification model.

Figure 5:
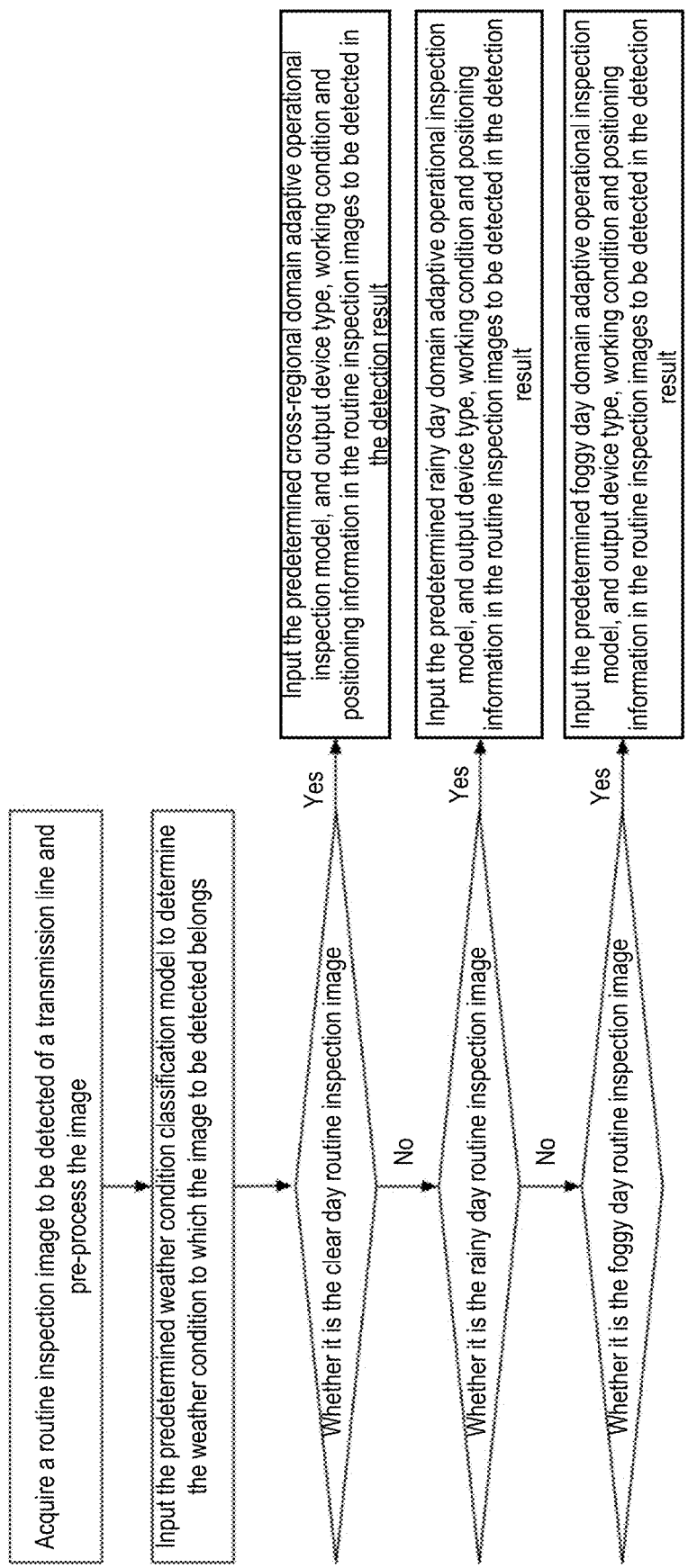
FIG. 5 is a flow chart of an operational inspection method for a domain adaptive device provided in the embodiment of the present invention.

An operational inspection method for a domain adaptive device as shown in FIG. 5, including the following steps:

S1: an image acquisition processing module is used to acquire a routine inspection image to be detected of a transmission line and pre-process the image;

S2: the routine inspection image to be detected is inputted into a predicted weather condition classification model to identify the weather condition to which the routine inspection image belongs, so as to obtain a weather condition classification result;

S3: a corresponding predetermined domain adaptive device operational inspection model is selected according to the weather condition classification result; and S4: the routine inspection image to be detected is inputted into the predetermined domain adaptive device operational inspection model to obtain a detection result of the routine inspection image to be detected, wherein the detection result includes one or a combination of more of the device type, the working condition and the position information of a detection object in the routine inspection image to be detected.

It is to be noted that with respect to the embodiments of operational inspection training methods, detection method and system for the domain adaptive device in the embodiments, to simplify description, they are all expressed as a combination of a series of steps or operations. However, those skilled in the art shall know that the application is not limited by the order of execution described herein. In accordance with the application, some steps or operations may be in other sequences or may be conducted simultaneously.

The preferred embodiments of the application disclosed above are only used to help illustrate the present invention and core concept. For those of ordinary skill in the art, variations will be made in specific application scenarios and implementing operations in terms of concept of the present invention. The description shall not be construed as limitation to the present invention. The present invention is merely subject to the claims and the full coverage and equivalents thereof.

What is claimed is:

1. An operational inspection system for a domain adaptive device, comprising an image acquisition processing module, a weather condition classification module and a domain adaptive device operational inspection module,
    wherein the domain adaptive device operational inspection module is configured to construct and predetermine a domain adaptive device operational inspection model, the domain adaptive device operational inspection model comprising a hierarchical feature extraction module, a fusion feature multi-aligning module, a region-of-interest generation module, a detector and a loss calculation module;
    the image acquisition processing module is configured to acquire a routine inspection image of a transmission line device and pre-process the routine inspection image, and to send the pre-processed routine inspection image to the weather condition classification module and a domain adaptive feature extraction module;
    the weather condition classification module is configured to construct and predetermine the weather condition classification model, the weather condition classification model is configured to identify a weather condition to which the route inspection image belongs and to input the routine inspection images under different weather conditions to the predetermined domain adaptive device operational inspection model under corresponding conditions according to a classification result;
    the pre-processed routine inspection image is inputted into the hierarchical feature extraction module in the predetermined domain adaptive device operational inspection module, and features in a last layer are input into the region-of-interest generation module; and
    the region-of-interest generation module is configured to acquire a candidate region which may include features of an operational inspection object in the features in the last layer and to perform regional feature acquisition on the features in the last layer according to the candidate region; and the acquired regional features are input into the detector module for detection to obtain a detection prediction result that comprises a type, a working condition and a positioning coordinate of a detected device.

2. The operational inspection system for the domain adaptive device according to claim 1, wherein the image acquisition processing module comprises a clear day source domain input data processing module, a cross-regional clear day target domain data processing module, a rainy day condition target domain data synthesis module and a foggy day condition target domain data synthesis module required when the predetermined domain adaptive device operational inspection model is trained;
    the clear day source domain input data processing module is configured to acquire the routine inspection image of the transmission line device in a clear day environment, i.e., a clear day image, to acquire an image set and to label a type, a working condition and a positioning coordinate of the corresponding target in the image, and to output a source domain data set $D_s$;
    the cross-regional clear day target domain data processing module is configured to process the routine inspection image of the transmission line device in a region different from the source domain;
    the source domain data set $D_s$ is inputted into the rainy day condition target domain data synthesis module to correspondingly execute a rainy data transmission line device routine inspection image synthesis and calculation module according to a task requirement;
    the source domain data set $D_s$ is inputted into the foggy day condition target domain data synthesis module to correspondingly execute a foggy data transmission line device routine inspection image generation and calculation module according to a task requirement;
    a target domain data set $D_t$ can be acquired by any one of the cross-regional clear day target domain data processing module, the rainy day condition target domain data synthesis module or the foggy day condition target domain data synthesis module, and the target domain set $D_t$ is unlabeled data, wherein the rainy data transmission line device routine inspection image synthesis and calculation module generates rainy day images by adopting an image synthesis technique, and the foggy data transmission line device routine inspection image generation and calculation module generates foggy day images by using a network.

3. The operational inspection system for the domain adaptive device according to claim 1, wherein in the domain adaptive device operational inspection model, the hierarchical feature extraction module is implemented based on a deep convolutional network; the hierarchical feature extraction module is constructed as length and width scales of an output feature are respectively three scales corresponding to three different proportions of the size of an input image, and the hierarchical feature extraction module comprises a first feature extraction layer $l_1$, a second feature extraction layer $l_2$ and a third feature extraction layer $l_3$ in a serial relation and respectively outputs a first feature $f_1$, a second feature $f_2$ and a third feature $f_3$ with three different sizes comprising different information; the hierarchical feature extraction module inputs images and labels of the source domain data set $D_s$ and images of any one target domain data set $D_t$ and outputs a first source domain feature $f_1^s$, a second source domain feature $f_2^s$, a third source domain feature $f_3^s$ and a first target domain feature $f_1^t$, a second target domain feature $f_2^t$ and a third target domain feature $f_3^t$, comprising different information, of different sizes; and a basic feature extraction network of the hierarchical feature extraction module comprises a VGG16 network.

4. The operational inspection system for the domain adaptive device according to claim 3, wherein the fusion feature multi-aligning module comprises a hierarchical gradient reversal calculation module, a cross-layer contextual information fusion module and a multi-domain classification module, and is configured to implement consistent multi-adversarial learning, and prompts the domain adaptive device operational inspection module to learn domain semantic invariable feature expression based on the fusion features, so as to reduce distributional difference of the source domains and the target domains.

5. The operational inspection system for the domain adaptive device according to claim 4, wherein the hierarchical gradient reversal calculation module comprises a first gradient reversal calculation unit $GRL_1$, a second gradient reversal calculation unit $GRL_2$ and a third gradient reversal calculation unit $GRL_3$, and is configured to convert a gradient value required into an opposite number of the gradient value itself when optimized parameters are propagated backwards in a training process and not to calculate an inputted feature pattern when the optimized parameters are propagated forwards; the first source domain feature $f_1^s$ and the first target domain feature $f_1^t$ are inputted into the first gradient reversal calculation unit $GRL_1$, so as to output the first source domain feature $f_{11}^s$ subjected to reversal calculation and the first target domain feature $f_{11}^t$ subjected to reversal calculation; the second source domain feature $f_2^s$ and the second target domain feature $f_2^t$ are inputted into the second gradient reversal calculation unit $GRL_2$, so as to output the second source domain feature $f_{22}^s$ subjected to reversal calculation and the second target domain feature $f_{22}^t$ subjected to reversal calculation; and the third source domain feature $f_3^s$ and the third target domain feature $f_3^t$ are inputted into the third gradient reversal calculation unit $GRL_3$, so as to output the third source domain feature $f_{33}^s$ subjected to reversal calculation and the third target domain feature subjected to reversal calculation $f_{33}^t$.

6. The operational inspection system for the domain adaptive device according to claim 5, wherein the cross-layer contextual information fusion module comprises feature nondestructive deformation calculation and cross-layer fusion calculation; the feature nondestructive deformation calculation is used for respectively executing scale consistency deformation calculation without discarded feature information on the first source domain feature $f_{11}^s$ subjected to reversal calculation, the second source domain feature $f_{22}^s$ subjected to reversal calculation, the first target domain feature $f_{11}^t$ subjected to reversal calculation and the second target domain feature $f_{22}^t$ subjected to reversal calculation, outputted by the hierarchical gradient reversal calculation module according to the feature scales of the third source domain feature $f_{33}^s$ subjected to reversal calculation and the third target domain feature $f_{33}^t$ subjected to reversal calculation, with a calculating function as follows:

$$F_{(c,h,w)}'=F_{(c*s^2,h/s,w/s)};$$

where c is a channel quantity of the feature pattern, w and h are respectively width and height of the feature pattern, s is an order of magnitudes of scale variation, the order of magnitudes of scale variation s comprises one or more of 2, 4 or ½ and ¼, wherein the first source domain feature $f_{11}^s$ subjected to reversal calculation and the second source domain feature $f_{22}^s$ subjected to reversal calculation are subjected to feature nondestructive deformation to obtain $f_1^{s'}$ and $f_2^{s'}$; the cross-layered fusion calculation is used for executing cross-layer fusion calculation on the feature pattern with consistent scale to obtain a contextual information enhanced fusion feature; a method for the cross-layer fusion calculation comprises one of splicing, adding, multiplying and vector product; scale consistency operation and fusion calculation are performed on a feature that is outputted by the first gradient reversal calculation unit $GRL_1$, the second gradient reversal calculation unit $GRL_2$ and the third gradient reversal calculation unit $GRL_3$ and inputted into cross-layer contextual information infusion module, so as to construct a strong semantic fusion feature; $f_1^{s'}$ is fused to the second source domain feature $f_{22}^s$ subjected to reversal calculation to output a first source domain fusion feature $g_1^s$, $f_2^{s'}$ is fused to the third source domain feature $f_{33}^s$ subjected to reversal calculation to output a second source domain fusion feature $g_2^s$, the third source domain feature $f_{33}^s$ subjected to reversal calculation is fused to $f_1^{s'}$ to output a third source domain fusion feature $g_3^s$, and a same fusion policy is performed by a target domain hierarchical feature to output a first target domain fusion feature $g_1^t$, a second target domain fusion feature $g_2^t$ and the third target domain fusion feature $g_3^t$.

7. The operational inspection system for the domain adaptive device according to claim 6, wherein the multi-domain classification module comprises three domain classification sub-networks $G_d^k$ and k=1,2,3 to predict whether the source domain fusion features and the target domain fusion features either belong to the source domain data set $D_s$ or belong to the target domain data set $D_t$; the first source domain fusion feature $g_1^s$ and the first target domain fusion feature $g_1^t$ are inputted into the first domain classification sub-network $G_d^1$ to output prediction results $y_1^s$ and $y_1^t$, the fusion features $g_2^s$ and $g_2^t$ are similarly operated as an input of the second domain classification sub-network $G_d^2$ to output prediction results $y_2^s$ and $y_2^t$, and the fusion features $g_3^s$ and $g_3^t$ are similarly operated as an input of the third domain classification sub-network $G_d^3$ to output prediction results $y_3^s$ and $y_3^t$, and a multi-domain classification loss function is defined as follows:

$$L_{G_d^k}(G_d^k,F)=\Sigma_{f_c^s \sim D_s} \log(G_d^k(g_c^s))+\Sigma_{f_c^t \sim D_t} \log(1-G_d^k(g_c^t));$$

where $g_c^s$ is the source domain fusion feature, $g_c^t$ is the target domain fusion feature c=1,2,3, F represents a hierarchical feature extraction mode, and $L_{G_d^k}$ is the multi-domain classification loss function; and consistency constraint is performed on the three domain classification sub-networks $G_d^k$ in the multi-domain classification module, such that the calculation loss value of each domain classification sub-network keeps consistency of an adjustment range of network parameters, so as to prompt learning of domain invariable feature expression in multi-adversarial learning, wherein a loss function for consistency constraint of the domain classification sub-networks is defined as follows:

$$L_{con}(G_d^1,G_d^2,G_d^3)=\Sigma_{i,j=1,2,3}\|G_d^i(g_i^s)-G_d^j(g_j^s)\|+\Sigma_{i,j=1,2,3}\|G_d^i(g_i^t)-G_d^j(g_j^t)\|.$$

8. The operational inspection system for the domain adaptive device according to claim 7, wherein the region-of-interest generation module is configured to determine whether objects in k anchors included in pixel points of an original image corresponding to the third source domain feature $f_{33}^s$ subjected to reversal calculation are targets or backgrounds; as labeled samples in the source domain are subjected to supervised training, the region-of-interest generation module is capable of generating p regions-of-interest for the third source domain feature $f_{33}{}^s$ subjected to reversal calculation, each of the regions-of-interest comprising a foreground, i.e., the target or the background; corresponding positions of the third source domain feature $f_{33}{}^s$ subjected to reversal calculation was tailored based on the generated regions-of-interest to output p region-of-interest feature patterns; and the detector module comprises a head network, a device working condition identifier and a device positioner which are respectively configured to input the p region-of-interest feature patterns and label information for predicting the types, the working conditions and the positioning coordinates of a plurality of devices, to calculate classification prediction loss values based on a cross entropy loss function $L_{cls}$ and to calculate coordinate prediction loss values based on a smooth L1 loss function $L_{bbox}$; and the loss calculation module comprises a multi-domain classification loss function $L_{G_d^k}$, a consistency constraint loss function $L_{con}$, a classification loss function $L_{cls}$ and a coordinate prediction loss function $L_{bbox}$.

9. The operational inspection system for the domain adaptive device according to claim 8, wherein in the domain adaptive device operational inspection module, after the domain adaptive device operational inspection module is constructed, detector module training and consistent multi-adversarial training on the fusion feature multi-aligning module are conducted synchronously, comprising forward propagation calculation and backward parameter update;

the forward propagation calculation means that the source domain and the target module enter the hierarchical feature extraction module simultaneously to output hierarchical features, the hierarchical features passing through the hierarchical gradient reversal calculation module are inputted into a plurality of groups of fusion features outputted by the cross-layer contextual information fusion module, the multi-domain classification module conducts domain classification predicted values on the inputted plurality of groups of fusion features and calculate multi-domain classification loss $L_{G_d^k}$, constrains predicted output of the domain classification sub-network through the consistency constraint of the domain classification sub-network and calculates the consistency loss $L_{con}$, and meanwhile, the detector module predicts the hierarchical features in the last layer of the source domain and calculates the classification loss $L_{cls}$ and the coordinate prediction loss $L_{bbox}$;

the back parameter update means that parameters of the constructed domain adaptive device operational inspection model are updated based on a back propagation algorithm; the network parameters $\theta_d^k$ of the domain classification sub-network $G_d^k$ are updated by a domain classification gradient value calculated by a predicted loss of the domain classification sub-network; gradient reversal calculation is conducted when the domain classification gradient value is propagated backwards to the hierarchical gradient reversal calculation module, i.e., the gradient value is calculated as the opposite number of the gradient value itself to continuously update parameters $\theta_f$ of the hierarchical feature extraction module; and meanwhile, the parameters $\theta_f$ of the hierarchical feature extraction module are synchronously updated by the classification and positioning gradient values calculated by the classification and positioning losses of the detector module, wherein network updating calculation is defined as follows:

$$\theta_d^k \leftarrow \theta_d^k - \mu \left( \frac{\partial L_{G_d^k+}}{\partial \theta_d^k} + \frac{\partial L_{con+}}{\partial \theta_d^k} \right)$$

$$\theta_F \leftarrow \theta_F - \mu \left( \frac{\partial L_{cls+}}{\partial \theta_F} + \frac{\partial L_{bbox+}}{\partial \theta_F} + \frac{\partial L_{G_d^k-}}{\partial \theta_F} \right)$$

where $L_{G_d^k+}$ represents a minimum multi-domain classification loss, u represents a learning rate, $L_{G_d^k+}$ represents the minimum multi-domain classification loss, such that the domain classification sub-module can differentiate whether the domain samples are from the source domain or the target domain, $L_{G_d^k-}$ represents the maximum multi-domain classification loss to draw distribution of the source domain close to distribution of the target domain, $L_{con+}$ represents the minimum consistency loss of the domain classification sub-network, $\theta_d^k$ and $\theta_F$ are optimized in a united manner to achieve consistent multi-adversarial leaning to promote the domain adaptive device operational inspection model to learn domain semantic invariable feature expression so as to reduce the distribution difference of the source domain and the target domain, such that the domain adaptive device operational inspection model has a stronger generalization ability; $L_{cls+}$ represents the minimum classification loss, $L_{bbox+}$ represents the minimum coordinate prediction loss, and the trained predetermined domain adaptive device operational inspection model is acquired by iterative optimization; and one or more predetermined domain adaptive device operational inspection models can be acquired by inputting training target domain data sets under different conditions.

10. The operational inspection system for the domain adaptive device according to claim 1, wherein the weather condition classification model comprises a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and a clear day image, a rainy day image and a foggy day image obtained in the image acquisition processing module are inputted into the weather condition classification model for training to obtain the trained predetermined weather condition classification model.

11. An operational inspection method for a domain adaptive device based on the operational inspection system for a domain adaptive device according to claim 1, comprising the following steps:

S1: Using an image acquisition processing module to acquire a routine inspection image to be detected of a transmission line and to pre-process the image;

S2: inputting the routine inspection image to be detected into a predetermined weather condition classification model to identify the weather condition to which the routine inspection image belongs, so as to obtain a weather condition classification result;

S3: selecting a corresponding predetermined domain adaptive device operational inspection model according to the weather condition classification result; and S4: inputting the routine inspection image to be detected into the predetermined domain adaptive device operational inspection model to obtain a detection result of the routine inspection image to be detected, wherein the detection result includes one or a combination of more of the device type, the working condition and the position information of a detection object in the routine inspection image to be detected.

12. The operational inspection system for the domain adaptive device according to claim 2, wherein the weather condition classification model comprises a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and a clear day image, a rainy day image and a foggy day image obtained in the image acquisition processing module are inputted into the weather condition classification model for training to obtain the trained predetermined weather condition classification model.

13. The operational inspection system for the domain adaptive device according to claim 3, wherein the weather condition classification model comprises a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and a clear day image, a rainy day image and a foggy day image obtained in the image acquisition processing module are inputted into the weather condition classification model for training to obtain the trained predetermined weather condition classification model.

14. The operational inspection system for the domain adaptive device according to claim 4, wherein the weather condition classification model comprises a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and a clear day image, a rainy day image and a foggy day image obtained in the image acquisition processing module are inputted into the weather condition classification model for training to obtain the trained predetermined weather condition classification model.

15. The operational inspection system for the domain adaptive device according to claim 5, wherein the weather condition classification model comprises a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and a clear day image, a rainy day image and a foggy day image obtained in the image acquisition processing module are inputted into the weather condition classification model for training to obtain the trained predetermined weather condition classification model.

16. The operational inspection system for the domain adaptive device according to claim 6, wherein the weather condition classification model comprises a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and a clear day image, a rainy day image and a foggy day image obtained in the image acquisition processing module are inputted into the weather condition classification model for training to obtain the trained predetermined weather condition classification model.

17. The operational inspection system for the domain adaptive device according to claim 7, wherein the weather condition classification model comprises a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and a clear day image, a rainy day image and a foggy day image obtained in the image acquisition processing module are inputted into the weather condition classification model for training to obtain the trained predetermined weather condition classification model.

18. The operational inspection system for the domain adaptive device according to claim 8, wherein the weather condition classification model comprises a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and a clear day image, a rainy day image and a foggy day image obtained in the image acquisition processing module are inputted into the weather condition classification model for training to obtain the trained predetermined weather condition classification model.

19. The operational inspection system for the domain adaptive device according to claim 9, wherein the weather condition classification model comprises a feature extraction model and a classifier; the feature extraction model is implemented by a convolutional neural network; the routine inspection image is inputted into the feature extraction model to obtain the feature pattern of the routine inspection image, and the feature pattern is inputted into a classifier constructed by a standard fully connected neural network so as to identify the weather condition to which the routine inspection image belongs; and a clear day image, a rainy day image and a foggy day image obtained in the image acquisition processing module are inputted into the weather condition classification model for training to obtain the trained predetermined weather condition classification model.

20. An operational inspection method for a domain adaptive device based on the operational inspection system for a domain adaptive device according to claim 2, comprising the following steps:

- S1: Using an image acquisition processing module to acquire a routine inspection image to be detected of a transmission line and to pre-process the image;
- S2: inputting the routine inspection image to be detected into a predetermined weather condition classification model to identify the weather condition to which the routine inspection image belongs, so as to obtain a weather condition classification result;
- S3: selecting a corresponding predetermined domain adaptive device operational inspection model according to the weather condition classification result; and
- S4: inputting the routine inspection image to be detected into the predetermined domain adaptive device operational inspection model to obtain a detection result of the routine inspection image to be detected, wherein the detection result includes one or a combination of more of the device type, the working condition and the position information of a detection object in the routine inspection image to be detected.

* * * * *